United States Patent Office 3,001,708
Patented Sept. 26, 1961

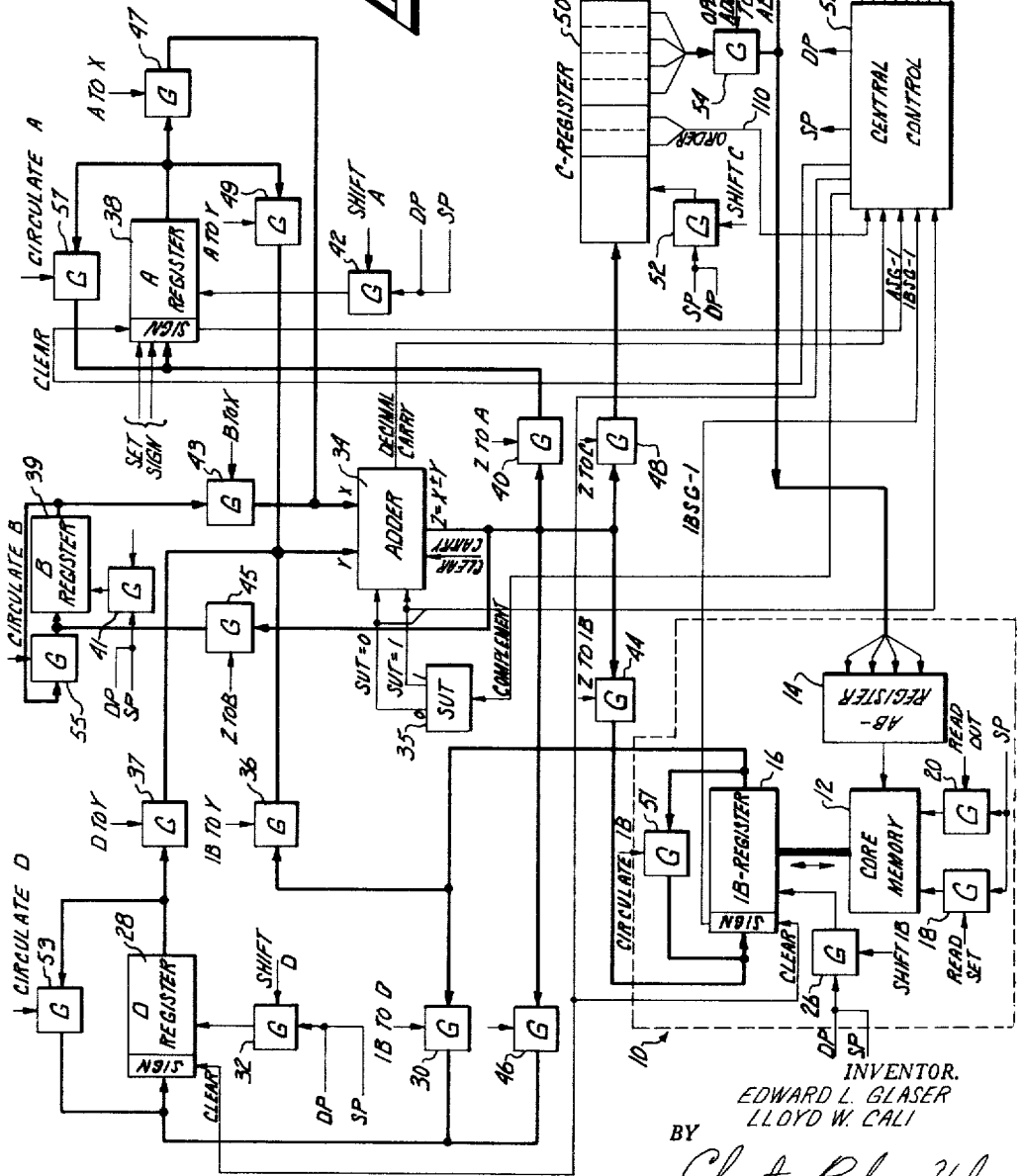

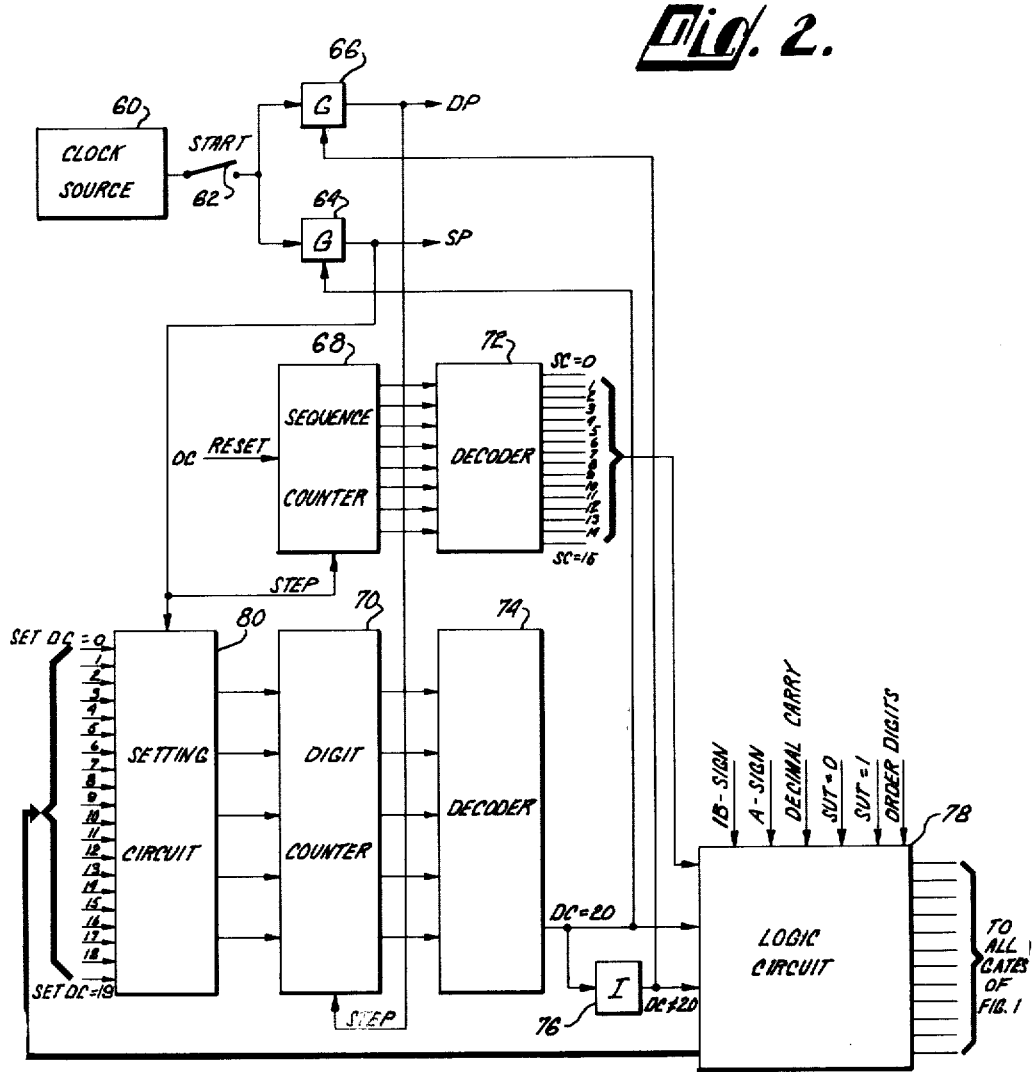

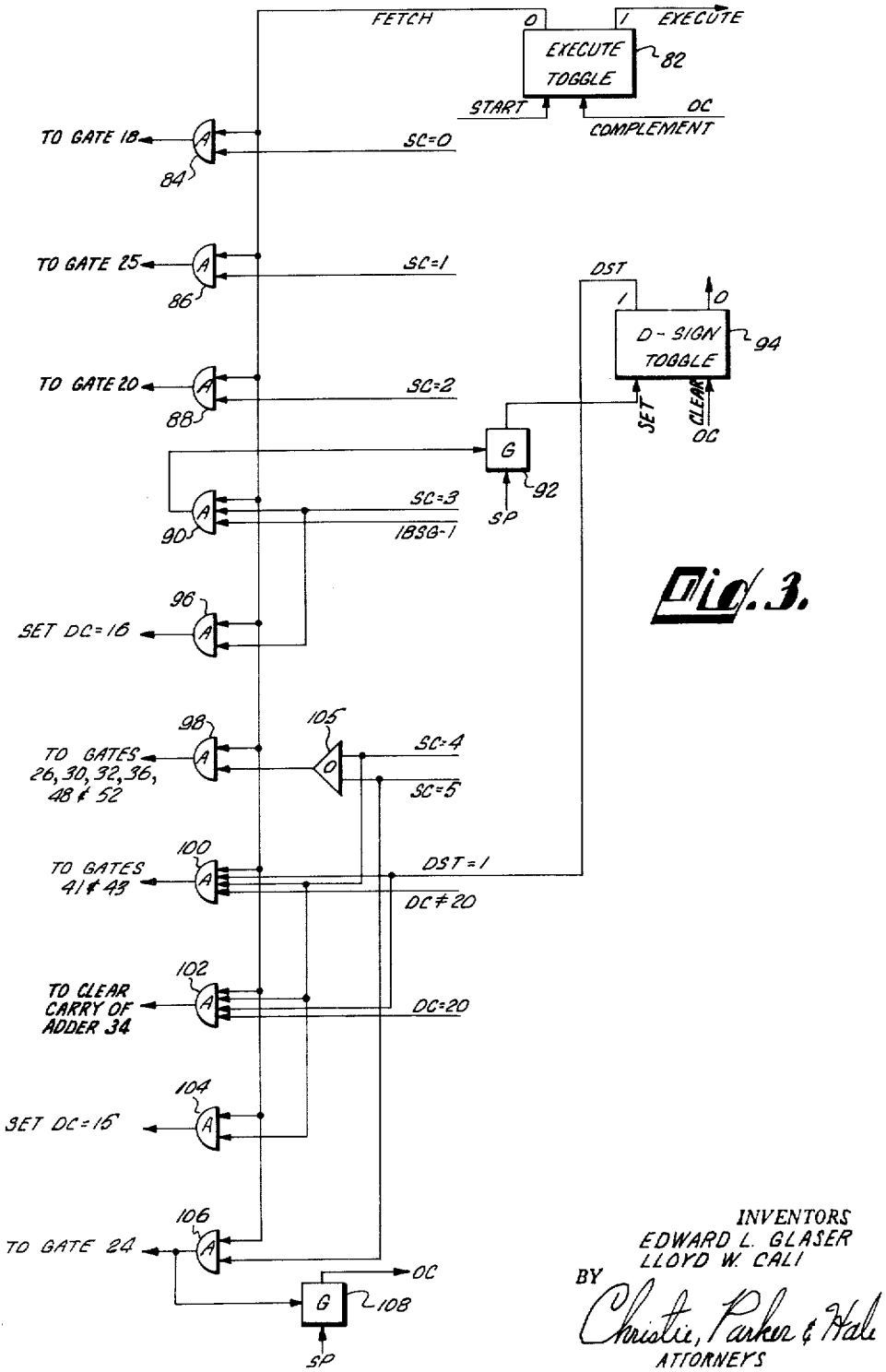

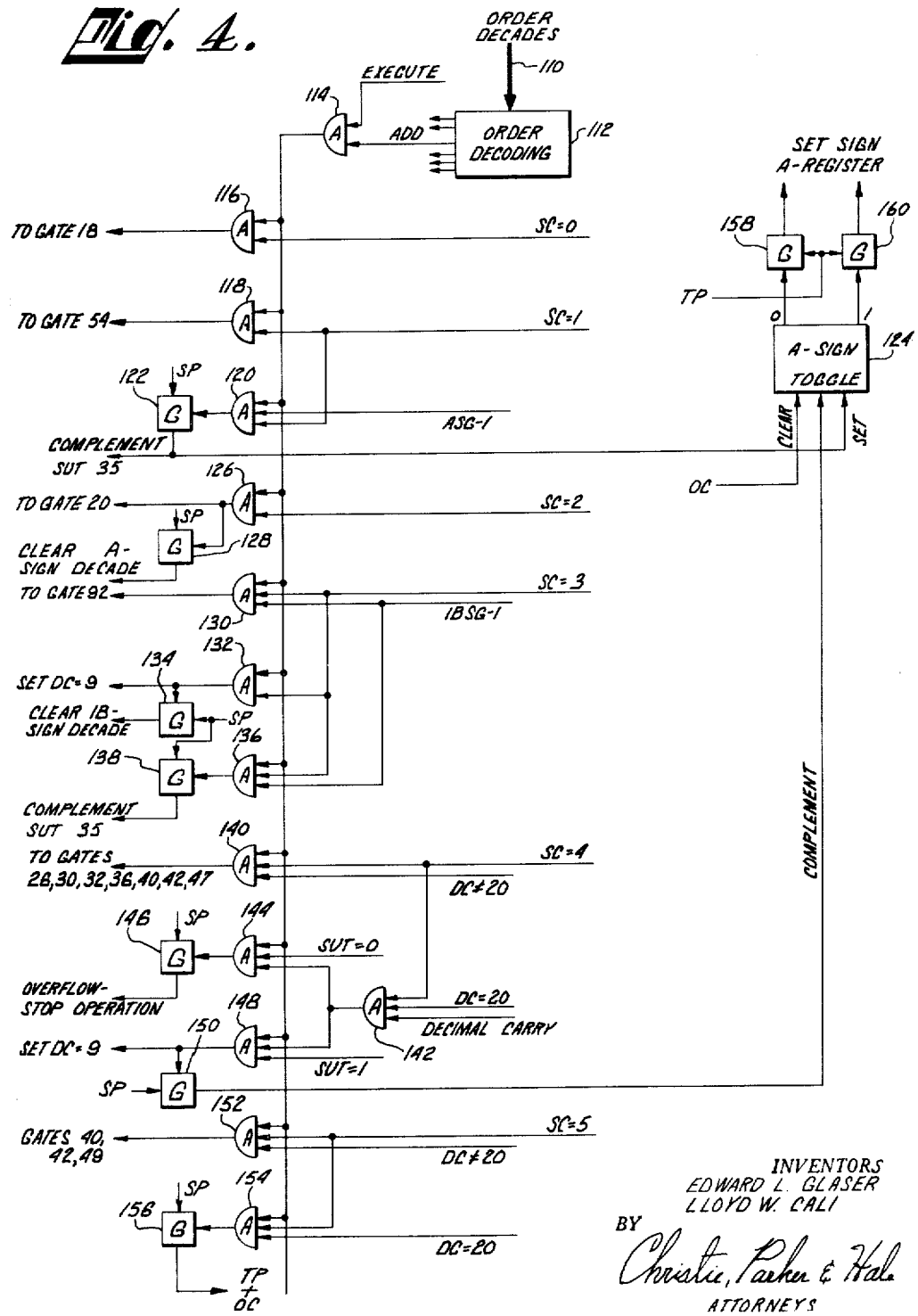

3,001,708
CENTRAL CONTROL CIRCUIT FOR COMPUTERS
Edward L. Glaser, Altadena, and Lloyd W. Cali, Monrovia, Calif., assignors to Burroughs Corporation, Detroit, Mich., a corporation of Michigan
Filed Jan. 26, 1959, Ser. No. 788,823
7 Claims. (Cl. 235—157)

This invention relates to electronic computers, and more particularly, is concerned with the central control circuit for controlling the operation of a digital computer.

In an internally programmed computer, successive commands which are to be executed by the computer are stored in memory, the sequence of commands as stored in memory being determined by the programmer of the computer according to the requirements of the problem to be solved by the computer. In order to simplify the programmer's job in setting up the computer and increase the speed in the overall operation of the computer in performing specific problems, computers may be designed to automatically perform in response to predetermined commands a number of different complex operations. Many of the more complex command operations could be accomplished by suitable programming using a number of more basic commands.

By placing the burden solely on the programmer and without consideration to the time required, such a basic computer can be made to perform many complex operations. However, by wiring the logic of the machine to perform certain routines automatically in the form of special commands, the programmer's problems are greatly simplified and the overall operation speed of the computer can be greatly increased. The number of different commands by which predetermined routines can be automatically carried out by the computer is limited to a large degree by economics, since the more separate commands that are provided, the more complex the logic circuitry of the computer becomes.

Each command which a computer is designed to execute requires that the central control of the computer sequence the computer through a number of operational steps, such as shifting words from memory to a register, shifting words from one register through an adder to another register, shifting words back into specific memory locations, etc. The time required for setting up each sequence varies. Thus the central control must be designed to properly time the sequence of operations for each command so as to reduce the time for any given command execution to a minimum. Moreover, redundancy in the control circuitry for each command must be minimized in order to reduce the complexity and cost of the control circuitry.

The present invention is particularly directed to the design of control logic for a serial type digital computer. In such a machine, groups of digits, called words, are transferred within the computer digit by digit in time sequence. Thus if any one operation required in the execution of a given command requires the transfer of a complete word, time must be allowed for the shifting in sequence of all the digits of that word. Sometimes it is necessary to shift fewer digits than called for by the entire word. In such case it is desirable that the time allowed for such operation is reduced appropriately. It has been the general practice heretofore in serial type machines to provide a fixed number of pulses, corresponding to the number of pulses required to shift a complete word, for each sequence operation called for in executing a given command. Such control logic obviously is redundant in time since many operations need but a fraction of the time required to shift an entire word serially.

The present invention provides an improved and simplified control logic for a digital computer. A significant increase in speed is accomplished by employing timing based an a selectable number of digit pulses rather than on a fixed number of digit pulses, i.e., a fixed number of pulses required to shift an entire word serially in the computer.

In brief, the present invention provides a central control circuit for a digital computer comprising two counters; a sequence counter and a digit counter. These counters are set by two types of pulses called sequence pulses and digit pulses. The digit counter is stepped by digit pulses and the sequence counter is stepped by sequence pulses. Both the sequence pulses and digit pulses are derived from a clock pulse source, the condition of the digit counter determining whether sequence pulses or digit pulses are generated. Sequence pulses are generated whenever the digit counter is in a predetermined count condition. Whenever the digit counter is set to some other count condition, digit pulses are then generated which step the digit counter back to the predetermined count condition at which the digit pulses cease and the sequence pulses again are generated.

Setting of the digit counter is in turn controlled by the sequence counter. A logic circuit responsive to the count condition of the sequence counter and responsive to information indicating the particular command being executed, automatically sets the digit counter to any predetermined value according to the number of digit pulses required for a given operation. The sequence counter in addition to setting the digit counter also controls the computer to sequence it through the desired number of sub-operations required to execute a given command. In this manner the sequence counter is used to define the different sub-operations in the execution of a given command and at the same time controls the setting of the digit counter, while the digit counter in turn, according to its setting, defines the number of repetitions of each sub-operation in the execution of a command.

For a more complete understanding of the invention, reference should be had to the accompanying drawings, wherein:

FIG. 1 is a block diagram showing the basic units of a computer employing the present invention, the heavy lines indicating the flow of information and the light lines indicating the control circuits;

FIG. 2 is a more detailed block diagram of the central control for the computer shown in FIG. 1;

FIG. 3 is a logic diagram of a gating circuit required for a command-fetch operation of the computer; and FIG. 4 is a logic diagram of a gating circuit required for an execute-add operation of the computer.

Referring to FIG. 1 in detail, there is shown by way of example a block diagram of the basic units of a digital computer of the serial type. While information can be coded in any desired form in the registers, it is assumed that information is represented in binary-coded decimal form, i.e., decimal digits are represented by four binary bits preferably according to a 1, 2, 4, 8 code. This is a conventional code and requires four flip-flops to store four bits representing one decimal digit. The four flip-flops which store one digit are referred to as a decade.

Further, in the computer of FIG. 1, it is assumed that all information is stored in the form of words, the standard word length being ten digits plus sign. The digits comprising words are generally circulated serially, i.e., a digit at a time, in the computer of FIG. 1, by transferring simultaneously the four bits representing a digit in parallel from one decade to another. Words circulated in the computer are generally of two types, namely, operands and commands. The command words have designated digits which represent the order to be executed, such as the order to execute an add cycle, a multiply cycle, or the like. Other designated digits in the command word represent the address of operands stored in the memory portion of the computer, each command operand to be used in executing the particular command.

With these general principles of operation in mind, reference may be had to the details of FIG. 1 in which the numeral 10 indicates generally the memory portion of the computer in which commands and operands are stored. The memory 10 is preferably of a random access magnetic core type such as described in detail in the book "Digital Computer Components and Circuits" by R. K. Richards, D. Van Nostrand & Co., 1957, chapter 8. The computer memory includes a core memory circuit 12 which comprises a coincidence core matrix circuit and suitable driver and sensing circuits. Associated with the core memory circuit 12 is an address buffer (AB) register 14 and an information buffer (IB) register 16. The AB-register 14 includes four decades, for example, for storing the digits designating an address location in memory, the levels in the flip-flops of the AB-register 14 being used by the core memory circuit 12 to read in or read out a word from the designated location in the core memory.

The IB-register 16 includes eleven decades for temporarily storing one complete word. Information bits can be transferred in parallel form the flip-flops of the eleven decades to a designated memory location or out of a designated memory location in the core memory circuit 12. A pulse applied through a gate 18 may be used to set the core memory circuit 12 to read out information in a designated address location to the IB-register 16. Actual transfer is effected by a pulse passed by a second gate 20 whereby transfer to the IB-register can be synchronized to take place at a particular pulse time.

Commands are generally fetched from the core memory 12 in a predetermined sequence. The address for fetching commands can be controlled by an address counter 22. The address counter comprises four decades, each decade acting as a binary counter and producing an overflow pulse when the decade is counted ten times. The decade storing the least significant digit is stepped by input pulses applied through a gate 24. The address counter 22 is counted up one digit at a time by an input pulse following each fetch operation of a command from the memory 10. Parallel transfer of the four digits from the address counter 22 to the AB-register 14 is effected by opening a gating circuit 25 at the appropriate time.

Once a word is read into the IB-register of memory, it can be read out serially to a number of different locations in the computer. To this end the IB-register 16 is arranged as four conventional shift registers in parallel for shifting out four bits comprising one digit each time a shift pulse is applied to the register, starting with the four bits defining the least significant digit and ending with the sign digit. To shift information out, shift pulses are applied, as required, to the register through a gate 26.

One route of transfer of words from the IB-register 16 is to a D-register 28 which is substantially identical to the register 16. Transfer is controlled by a gate circuit 30 which controls the transfer of the four bits of each digit transferred. Shifting pulses are applied to the D-register 28 through a gate 32. With the gate 30 open, and shifting pulses applied through open gates 26 and 32, digits are transferred serially from the IB-register 16 into the sign decade end of the D-register 28. After eleven shifting pulses, one complete word is transferred from the register 16 to the register 28.

Words may be transferred a digit at a time from either the IB-register 16 or the D-register 28 to the Y-input of an adder circuit 34, transfer being effected through gate circuits 36 and 37. The adder 34 may be any type of conventional binary-coded decimal adder for producing a binary-coded decimal sum together with a decimal carry in response to two binary-coded decimal inputs. See for example the adder described in the British Patent 750,475, published Jun 13, 1956. The adder is arranged to produce either a sum or a difference, depending upon the setting of a flip-flop or a toggle 35, designated SUT.

The output at Z of the adder 34 generally is gated to an accumulator register 38 designated the A-register, the transfer being controlled by a gate 40. The A-register is the same as the IB and D-registers described above. Shifting pulses are applied to the A-register 38 through a gate 42 to shift digits serially through the A-register. The output of A-register may be coupled to the X-input of the adder 34 by a gate 47 or to Y-input of the adder by a gate 49.

The Z-output from the adder 34 may also be gated to the input of the IB-register 16 by means of a gate 44, or to the input of the D-register 28 through a gate 46 if desired for a particular operation. The Z-output from the adder 34 may also be gated, by means of a gate 48, to the input of a command register 50, designated the C-register similar to the A-register 38. Shifting pulses are applied to the C-register 50 through a gate 52.

The computer may also include a four digit shift register 39, designated the B-register. Shifting pulses are applied to the B-register 39 through a gate 41. The B-register adds flexibility to the computer, permitting additional operations to be performed, such as modifying the address portion of a command as it is fetched from memory. Thus the output of the B-register is coupled to the X-input of the adder 34 through a gate circuit 43. The input to the B-register may be coupled to the Z-output of the adder 34 through a gate circuit 45.

The IB, D, B, and A-registers are provided with gated circulation paths. The output of each register is coupled back to the input through a gate, such as indicated at 51, 53, 55, and 57 respectively. As pointed out heretofore, certain of the digits in the command word constitute an address for the operand in memory. These digits are sensed in the first four least-significant digit decades of the C-register 50, and are transferred in parallel to the AB-register 14 by means of a gate 54.

In operation, the computer fetches one command at a time from memory, according to the condition of the address counter 22, the command being transferred into the C-register 50. Once the command is in the C-register 50, it is used to control the subsequent execute operation of the computer according to the order stored in the next two decades of the C-register 50 following the address decades in the C-register.

The fetch operation involves an operational routine as does the execution of each of the commands. The particular sequence of steps or sub-operations which the computer goes through during a given command or during a fetch operation is uniquely determined by a central control unit 56. The central control unit senses the condition of the two decades in the C-register 50 in which the order digits are stored. It also contains a number of logic toggles, such as an Execute toggle that is set according to whether a fetch or an execute is to be performed. In response to the information fed into it, the central control of the computer sets the many gates in the computer by which the flow of information between the various registers and the adder is effected.

The central control circuit 56 as shown in block form in FIG. 2 includes a clock source 60 with which all operations of the computer are synchronized. Two types of pulses are derived from the clock source 60 when a starting switch 62 is closed, namely, sequence pulses designated SP, and digit pulses designated DP. The two types of pulses are derived by means of gates 64 and 66 respectively.

The central control circuit includes two different counters, a sequence counter 68 and a digit counter 70. The sequence counter 68 may be a conventional straight binary counter having, for example, four flip-flop stages for providing sixteen different binary count conditions. A decoder circuit 72 senses the condition of each of the flip-flops in the counter 68 and raises to a high potential level one of sixteen separate output lines according to the count condition of the sequence counter 68. The decoder 72 may be a conventional diode matrix circuit for converting from binary to decimal form. See for example the above-mentioned book by R. K. Richards, p. 56–60. The sixteen output lines are designated SC=0, SC=1, etc. The sequence counter 68 is reset to zero at the start of each operation of the computer, such as at the start of a fetch operation or the execution of a command by an OC pulse generated at the completion of the previous operation. The sequence counter is counted by SP's derived from the clock source 60 through the gate 64.

The digit counter 70 is also a binary counter similar to the counter 68. The digit counter 70 preferably includes five flip-flop stages, enabling it to count to as high as 32. However, it has been found that a count of 20 is adequate for most operations, although this figure is given by way of example only. The digit counter 70 is stepped or counted up by means of DP's derived from the clock source 60 through the gate 66. As in the case of the sequence counter 68, a decoder circuit 74 senses the condition of the flip-flop stages in the digit counter 70. However, the decoder 74 need have only one output line which is raised to a high potential level whenever the digit counter 70 is in the count 20 condition designated DC=20. The DC=20 output of the decoder is applied to the gate 64 so that the gate 64 is biased open to pass pulses from the clock source 60 to the sequence counter 68 only when the digit counter 70 is in the count 20 condition. The gate 66 is connected to the ouput of the decoder 74 through an inverter circuit 76 whereby the gate 66 is biased open whenever the digit counter is in a count condition other than 20, designated DC≠20. In other words, SP's are generated whenever the digit counter is equal to 20, and DP's are generated whenever the digit counter is not equal to 20.

The output lines of the decoders 72 and 74 are applied to a logic circuit 78. The logic circuit 78 also senses the digits stored in the order portion of the command register 50, the digits in the sign positions of the IB-register 16 and the A-register 38, as well as the state of SUT flip-flop 35 associated with adder 34 and the presence of a decimal carry from the adder 34. The logic circuit senses the stepping of the sequence counter 68, and in response to the order being executed as set by the digits in the order portion of the C-register 50, may set the digit counter 70 to any value other than 20 at any step of the sequence counter. This of course interrupts the action of the sequence counter until the digit counter is counted back to 20 by DP's. Setting of the digit counter is accomplished through a setting circuit 80, which may be a diode matrix circuit for converting from decimal notation to binary notation. The setting circuit 80 also includes gates on each of the lines to the digit counter 70 by means of which each of the flip-flops in the digit counter 70 may be set to correspond to any decimal digit less than 20 in response to an SP applied to the setting circuit 80. Thus by proper design of the logic circuit 78, any number of DP's can be generated between pairs of SP's for controlling computer operations.

In addition to controlling the sequence of SP's and DP's for each command, the logic circuit controls all the gates in the computer to control the transfer of information among the several registers and the adder. The logic circuit 78, in response to the stepping of the sequence counter 68, provides a series of different gating patterns in carrying out a given command, the patterns for each count condition of the sequence counter 68 being different for each command. At any given setting of the sequence counter 68, the sequence counter of course may be interrupted and a predetermined number of DP's generated for shifting the registers to shift information in the computer.

From the description thus far, it will be apparent that by suitable design of the logic circuit 78, the computer, can be made to carry out a sequence of sub-operations for each command. The logic circuit further can provide for the setting of the digit counter to provide any number of digit pulses necessary to complete any particular sub-operation. No superfluous pulses are ever generated, no multiple word times are necessary. Only the exact number of DP's required for each sub-operation are generated.

In general, the logic circuit 78 differs for each command. However, with the sequence counter and digit counter arrangement of the central control 56, as described above, it is relatively easy, once the steps to be performed by the computer in carrying out a given command are determined, to design the logic circuits for carrying out these steps. By virtue of the two-digit order number, up to a hundred commands may be accommodated, and of course, more commands can be accommodated if a larger order number is provided. The actual number of commands is generally less than one hundred. Once the logic design for carrying out each order is provided, redundancy can be avoided to reduce the complexity of the logic circuitry by careful design to combine the logic circuits for sub-operations that are identical in more than one command.

It is not believed necessary to the teaching of the present invention to describe more than a few typical operations of the computer and show the manner in which the logic circuit is designed to carry out these few operations. By way of example, the fetch operation and the add command will be described, the logic circuit for these two operations being shown resplectively in FIGS. 3 and 4.

Consider first the design of the logic circuit for the fetch operation. First, it must be determined whether the computer is to perform a fetch operation or an execute operation. To this end, the logic circuit is provided with an Execute toggle. This may be conventional flip-flop which is complimented by an OC pulse generated at the completion of each operation. The Execute toggle in the 0 stable state establishes a fetch operation and in the 1 stable state establishes an execute operation. Normally at the start of operation of the computer the Execute toggle 82 would be set to 0 state or fetch condition, applying a high voltage level to the fetch output line.

Since in the fetch operation it is desired to take a command from memory and transfer it to the C-register 50, the first sub-operation to be performed is to put the memory 10 in condition to read out. This requires the passing of a pulse by the gate 18 to the core memory circuit 12. The logic circuit is provided with a logical AND circuit 84 which senses when the fetch line from the Execute toggle 82 is at high level and when the SC=0 line from the decoder 72 is at high level. The logical AND circuit 84 produces a high level at the output when both the input levels are high, the high output level being applied to the gate 18 to pass the next SP to the core memory circuit 12 for setting it in the read condition. The same SP of course is applied to the sequence counter 68 for stepping it to the next count condition.

It is next necessary that the core memory be addressed to determine the location of the command to be read out of the core memory circuit 12. To this end a logical AND circuit 86 is provided which senses when the output line SC=1 from the decoder 72 is at a high level, and also that the Execute toggle 82 is in the fetch condition. If both these conditions are true, the AND circuit 86 opens the gate 25, transferring in parallel the address number in the counter 22 to the AB-register 14 in memory. The next SP then steps the sequence counter to the next count condition, in which the output line SC=2 from the decoder 72 is raised to a high level.

A logical AND circuit 88 senses the high level of the line SC=2 and also the high level of the fetch line from the Execute toggle 82, the output of the AND circuit 88 opening the gate 20. The next SP is passed by the gate 20 to the core memory circuit 12, causing a parallel transfer of the word at the designated address location to be transferred in parallel to the IB-register 16. The same SP steps the sequence counter to the next step condition in which the SC=3 line is raised to a high level.

At this point it is desired to shift the command from the IB-register 16 to the C-register 50. However, it may be desired in certain circumstances to modify the operand address portion of the command by the contents of the B-register 39. Whether the operand address is to be modified or not is determined by the digit in sign position of the command word. Only if the sign digit is odd is the address modification to be made. To this end the sign decade in the IB-register 16 is sensed by the logic circuit 78. If the lowest order bit storing flip-flop in the sign decade of the IB-register 16 is storing a binary one bit, the level of the line connected to one side of the flip-flop in the sign decade is raised to a high level. This line is designated the IBSG-1 line, indicating that it senses the 1-bit of the sign decade in the IB-register 16.

When a logical AND gate 90 senses that the Execute toggle 82 is in the fetch condition, that the sequence counter is in the SC=3 condition, and that the sign digit in the sign decade of the IB-register 16 is odd, it opens a gate 92, thereby passing the next SP to a D-sign toggle 94, designated DST. This toggle serves as temporary storage of sign information, i.e., whether the sign digit of the word fetched from memory is odd or even. Setting of the toggle 94 to the 1 state indicates that the address portion of the command is to be modified according to the B-register 39. At the same time a logical AND circuit 96 senses that the sequence counter is in the SC=3 condition and that the Execute toggle 82 is in the fetch condition. If both these conditions are true, the high output level from the logical AND circuit 96 is applied to the set 16 input of the setting circuit 80 whereby the next SP sets the digit counter 70 to the count 16 condition.

As indicated above, setting of the digit counter 70 to other than 20 interrupts the generation of SP's and starts the generation of DP's. It will be noted that the same SP that sets the toggle 94 and sets the digit counter 70 also steps the sequence counter 68 to the SC=4 condition. This SP is followed by four DP's before the next SP is generated.

A logical AND circuit 98, sensing that the sequence counter is in the SC=4 condition and that the Execute toggle 82 is in the fetch condition, opens the gate 26 to permit the DP's to shift the IB-register 16. Also the AND circuit 98 opens the gate 30 to permit digits to be transferred from the output of the IB-register 16 to the input of the D-register 28, and opens the gate 32 to permit DP's to shift the D-register 28. Also the gate 36 is biased open by the logical AND circuit 98 to permit transfer of digits from the output of the register 16 to the Y-input of the adder 34. In addition the gate 48 is opened to permit transfer of information from the Z-output of the adder 34 to the input of the C-register 50, DP's being applied to the shifting input of the C-register 50 by opening of the gate 52 by the output of the logical AND circuit 98.

With the setting of the digit counter to 16, it will be recognized that four DP's are generated before the digit counter is returned to the count 20 condition in which the DP's are gated off and SP's are again started. The four DP's are passed by the gates opened by the output of the logical AND circuit 98 while the sequence counter 68 remains in the SC=4 condition. This results in the first four digits out of the IB-register 16 being shifted through the adder 34 into the C-register 50.

Another logical and circuit 100 also senses when the sequence counter is in the SC=4 condition and the Execute toggle 82 is in the fetch condition. The logical AND circuit 100 also senses whether the DST toggle 94 has been set to 1, designated DST=1, indicating that the address portion of the command is to be modified in the adder by the B-register 39. If the toggle 94 has been set to raise the DST=1 line to a high level, and if the DC counter is not in the count 20 condition, wherein the DC≠20 line from the inverter 76 is at a high level, the output of the logical AND circuit 100 is raised to a high level, opening the gates 41 and 43 whereby the four DP's shift out the contents of the B-register to the X-input of the adder 34. Thus the contents of the B-register are added digit by digit to the address portion of the command read out of the IB-register 16, the sum being read into the C-register 50. Also at the end of four DP's, the DC counter is back to the count 20 condition.

If a B-modification has taken place, it is necessary to clear the internal carry of the adder 34 at the end of the four DP's. To this end a logical AND circuit 102, sensing that the Execute toggle 82 is in the fetch condition and that the sequence counter 68 is in the SC=4 condition, and that the DST toggle 94 has been set to 1, also senses when the DC counter returns to the DC=20 condition. At that time the logical AND circuit 102 produces a high output level, which is used to clear the adder 34 in response to the next SP.

During the time sequence counter is in the SC=4 condition, the setting circuit 80 is set to the DC=15 condition by means of a logical AND circuit 104 which senses the fetch line of the Execute toggle 82 and the SC=4 line from the decoder 72. When the DC counter is returned to the count 20 condition following the four DP's, the next SP sets the digit counter 70 to the count 15 condition and at the same time steps the sequence counter 68 to the SC=5 condition. The SP also shifts one more digit from the IB-register 16 through the adder to the C-register 50 and also to the D-register 28. Thus five digits of the eleven digit command have now been shifted from the IB-register 16 to the C-register 50, and the setting of the digit counter to DC=15 provides five additional DP's which are used together with the following SP to shift out the remaining six digits of the eleven-digit command word from the register 16 to the C-register 50.

To this end the logical AND circuit 98 is also used to sense when the sequence counter 68 is in the SC=5 condition. This may be done by means of a logical OR circuit 105 connecting both the SC=4 and SC=5 lines from the decoder 72 to the logical AND circuit 98. Thus the gates 26, 30, 32, 36, 48, and 52 remain open during both the SC=4 and SC=5 count condition to the sequence counter 68. This permits all eleven digits in the IB-register 16 to be shifted to the D-register 28 and the C-register 50. The next SP generated after the digit counter 70 returns to the count 20 condition completes the operation.

A logical AND circuit 106 is provided which senses when the sequence counter is in the SC=5 condition and the Execute toggle 82 calls for a fetch operation. The output of this logical AND circuit 106 opens the gate 24 so that the address counter 22 can be counted up 1 by an SP to provide the address of the next command to be fetched from memory. The logical AND circuit 106 can be used to open another gate 108 for passing the next SP. The output from the gate 108 is referred to as the operation clear pulse designated OC, and may be used to complement the Execute toggle 82 to the execute condition and to reset the D-sign toggle 94, the sequence counter 68, as well as to clear any other flip-flops throughout the computer that might need resetting at this time.

Once the command is in the C-register 50, the digits in two of the decades are sensed to determine the order, e.g., Add, Subtract, Multiply, etc. The digits in the order decades are sensed and transferred to the central control 56 by lines indicated at 110 in FIGS. 1 and 4. The condition of the various flip-flops in the two decades storing the two order digits are applied to an order decoding circuit 112, as shown in FIG. 4. The order-decoding circuit is a binary-to-decimal converter similar to the decoder 72 described above. In response to the two binary-coded decimal digits in the order decades of the C-register 50, the order-decoding circuit 112 energizes one of a hundred different output lines. Thus there is one output line for each of a maximum of a hundred different orders which the computer may be designed to execute.

The logic circuit for executing the Add order is shown by way of example in FIG. 4. The logic circuit for only one Execute order is shown since it is not believed essential to an understanding of the invention to show the logic for more than one order. It will be readily apparent to one skilled in the art from the description of the logic for the Fetch and Execute Add order the manner in which the invention may be used to simplify the design of the logic circuit for any operation which it is desired that the computer execute within the capabilities of the circuit described above in connection with FIG. 1.

Assuming that the order digits in the C-register 50 corresponds to the Add order, the Add line from the output of the order decoding circuit 112 is raised to a high level potential. This is applied to a logical AND circuit 114 which also senses the condition of the Execute toggle 82. If the toggle 82 is set to execute a command and the order of the command indicates that an add operation is being performed, the output of the AND circuit 114 is raised to a high level. The output from the AND circuit 114 primes the logic circuit for executing the add operation.

The add operation requires that the contents of the A-register 38 be added to the operand in the memory location specified by the address portion of the command in the C-register 50, the algebraic sum being placed in the A-register 38. Therefore the first operation is to read the operand from the core memory 12. To this end the logic circuit for the add operation, as shown in FIG. 4, includes a logical AND circuit 116 which senses that the sequence counter is in the SC=0 condition and that the output of the AND circuit 114 is high. The logical AND circuit 116 then opens the gate 18 so that the next SP sets the core memory 12 for a readout. The next SP also sets the sequence counter to the SC=1 condition.

Next, the operand address in the C-register is transferred to the AB-register 14. This is accomplished by a logical AND circuit 118 which senses that the sequence counter is in the SC=1 count condition and that an add-execute is called for as determined by the output of the logical AND circuit 114. The logical AND circuit 118 opens the gate 54, permitting parallel transfer of the digits stored in the address portion of the C-register 50 to the AB-register 14.

Also during the SC=1 condition of the sequence counter 68, the sign of the word stored in the A-register 38 is sensed. An odd digit in the sign decade of the A-register 38 indicates a negative number and an even digit in the sign decade of the A-register 38 indicates a positive number. It is only necessary to sense the flip-flop storing the lowest order bit in the sign decade. Thus a single line from the sign decade, designated the ASG-1 line, has a high level if the sign is negative.

A logical AND circuit 120 senses the level of the ASG-1 line from the sign decade of the A-register 38, and also senses the SC=1 line from the decoder 72 and the output of the logical AND circuit 114. If the sign of the word in the A-register 38 is negative, the logical AND circuit 120 biases open a gate 122 when the sequence counter is in the SC=1 condition. The gate 122 passes the next SP to the complement input of the SUT toggle 35. This sets the adder 34 to the subtract or (X−Y) operation. The SP passed by the gate 122 also sets an A-sign toggle 124, designated AST, which acts as a temporary storage for the sign of the word initially stored in the A-register 38.

The same SP passed by the gate 122 also steps the sequence counter to the SC=2 count condition. During the SC=2 time, information is transferred from the core memory 12 to the IB-register 16. To this end a logical AND circuit 126, connected to SC=2 line from the decoder 72 and to the output of the logical AND circuit 114, operates to open the gate 20 and pass the next SP to the core memory 12 for reading the operand out of the designated address into the IB-register 16. At the same time, the logical AND circuit 126 opens a gate 128 for passing an SP to clear the sign decade in the A-register 38 so that the sign digit will not affect the add operation. The same SP pulse also steps the sequence counter to the SC=3 count condition.

During SC=3 time, a logical AND circuit 130, connected to the output of the AND circuit 114 and the SC=3 line from the decoder 72, produces a high level output if the sign decade of the IB-register 16 is negative, i.e., if the IBSG-1 line is at a high level, indicating that the digit stored in the sign decade of the IB-register 16 is an odd number. The output of the logical AND circuit 130 opens the gate 92 so that the next SP sets the D-sign toggle 94 to 1 (see FIG. 3). This toggle 94 provides a temporary storage for the sign of the operand read out of memory.

Also during SC=3 time, the output of the logical AND circuit 132 raises the level on the set 9 line going into the setting circuit 80, whereby the next SP sets the digit counter 70 to the count 9 condition.

The output of the logical AND circuit 132 during SC=3 time also opens a gate 134 which passes the next SP to clear the sign decade of the IB-register 16. The same SP sets the sequence counter to the SC=4 condition. Because of the setting of the digit counter 70 to count 9, there follows eleven digit pulses before the digit counter 70 is returned to the count 20 condition and the next SP can be generated.

At the same time a logical AND circuit 136 senses the output of the AND circuit 114, SC=3 line from the decoder 72, and the IBSG-1 line from the sign decade of the IB-register 16. If IBSG-1 is equal to one, the AND circuit 136 opens a gate 138 which passes the next SP to the complement input of the SUT toggle 35. Thus, if both ASG-1 and IBSG-1 when sensed were one, the SUT toggle 35 is complemented twice, so that it is back in the initial zero state, establishing an addition. If the signs initiated by ASG-1 line and IBSG-1 line are unequal, the SUT toggle is only complemented once, leaving it in the one state establishing a subtraction.

A logical AND circuit 140 senses when the sequence counter is in the SC=4 condition and the digit counter is in the DC≠20 condition and opens the gate 26 to pass shifting pulses to the IB-register 16, opens the gate 30 to pass information shifted out the IB-register 16 into the D-register 28, opens the gate 32 to pass shifting pulses to the D-register 28, opens the gate 36 to pass information shifted out of the IB-register 16 to the Y-input of the adder 34, opens the gate 42 to pass shifting pulses to the A-register 38, opens the gate 47 to permit information shifted out of the A-register 38 to be passed to the X-input of the adder 34, and opens the gate 40 to permit information from the Z-output of the adder 34 to be passed to the input of the A-register 38. After 11 DP's both the word in the IB-register 16 and A-register 38 have passed through the adder and the sum has been shifted back into the A-register 38. If there is no decimal carry at the end of the add cycle, this indicates that the proper plus sign in the form of a zero is present in the sign decade of the A-register 38. In this event, the next SP steps the sequence counter to the SC=5 condition. However, if a decimal carry is present at the end of the add cycle so that the decimal carry output from the adder is at a high level, one of two conditions are indicated:

First, if the subtract toggle (SUT) 35 is zero, indicating that an algebraic addition took place in the adder, the decimal carry indicates an arithmetic overflow, i.e., the sum is greater than the ten digit capacity of the computer. An overflow stops further operation of the computer. To this end an AND circuit 142 is provided which senses when the sequence counter is in the SC=4 condition, when the DC counter is returned to the count 20 condition, and whether there has been a decimal carry. The output of the logical AND circuit 142 is applied to an AND circuit 144. The logical AND circuit 144 also senses the subtract (SUT) toggle 35 to see if it is in the zero condition, and also senses the output of the AND circuit 114. If all the required conditions are true, an overflow is indicated by opening a gate 146 which generates an overflow pulse in response to the next SP. This pulse may be used to stop the operation of the machine and to provide an overflow indication.

Second, there is a condition in which there is a carry from the adder 34, but the subtract toggle 35 is equal to 1, indicating that subtraction has taken place. This condition indicates that the operand stored in the IB-register 16 was a larger number than the operand stored in the A-register 38. This necessitates a decomplement cycle to obtain the correct result in the A-register. The decomplement cycle requires that the contents of the A-register 38 be subtracted from zero. For example, assume that the first subtraction involved the number 5555000000 in the A-register and the number 6666000000 in the IB-register. Since the contents of the IB-register was subtracted from the contents of the A-register, the result will be the number 8889000000 with a carry (or more precisely, a borrow). If now the contents of the A-register, namely 8889000000, is subtracted from zero during the decomplementing subtraction cycle, the correct sum will be produced, namely the number 1111000000, in the A-register. At this point of course, the original sign stored in the A-sign toggle 124 must be complemented, since the final sum will be of the opposite sign.

To sense the second condition and to initiate a decomplement cycle, a logical AND circuit 148 is provided which is coupled to the output of the logical AND circuit 142. It also senses when the SUT toggle 35 is in the one state, indicating a subtraction. If all the required conditions are true (in particular, if there has been a decimal carry and the subtract toggle 35 indicates that a subtraction has taken place, the output level of the logical AND circuit 148 will be high. This opens a gate 150, which passes the next SP to the complement input of the A-sign toggle 124 to change the toggle to its opposite stable condition, thereby complementing the sign information stored in the toggle 124, as required. The output of the logical AND circuit 148 is also applied to the set 9 input line of the setting circuit 80, whereby the digit counter 70 is set to the count 9 condition by the next SP. The same SP steps the sequence counter 68 to the SC=5 count condition.

With the digit counter in the count 9 condition, eleven DP's are generated which are used for carrying out the decomplement cycle. A logical AND circuit 152 is connected to the SC=5 line from the decoding circuit 72 and also to the DC≠20 line from the inverter 76 (see FIG. 2). If the required conditions are true, the output of the logical AND circuit 152 will be at a high level, which is used to open the gate 42 for passing DP's to shift the A-register 38 eleven times. At the same time, the gate 49 is opened by the output of the logical AND circuit 152 whereby the digits shifted out of the A-register 38 are applied to the Y-input of the adder 34. Also the gate 40 is opened so that the complemented digits at the Z-output of the adder 34 are shifted back to the input of the A-register 38. Since the adder subtracts the digits at the Y-input from the digits at the X-input, and since in effect, zeros are applied to the X-input, the digits shifted out of the A-register 38 are subtracted from zero, as required for the decomplementing operation. The resulting number in the A-register 38 is the correct sum.

All that remains for the add operation is that the proper sign be shifted back into the sign decade of the A-register 38. This is accomplished by a logical AND circuit 154 which produces a high level output when the digit counter 70 returns to the 20 condition, as sensed by the DC=20 line from the decoder 74 (see FIG. 2). The logical AND circuit 154 biases open a gate 156, passing the next SP. The pulse output from the gate 156 is used as a transfer pulse TP for effecting the transfer from the A-sign toggle 124 to the sign decade of the A-register. Thus the TP is passed by gates 158 and 160 controlled by the A-sign toggle 124. The TP is passed by one or the other of the gates 158 or 160 to the lowest order bit-storing flip-flop of the sign decade in the A-register 38, setting the flip-flop to the same condition as the A-sign toggle 124.

The TP can also be used as an operation-clear pulse OC for clearing various flip-flops in the computer, resetting the sequence counter 68, and complementing the Execute toggle 82 to start a fetch operation. It will be noted that the TP and OC are generated at SC=5 time even though a decomplement cycle is not required. Nothing takes place during SC=5 time, the digit counter remaining in DC=20 condition and the logical AND circuit 152 produces no high level output.

From the above two examples of the logic design for the Fetch and Execute cycles of the computer, it will be recognized that the sequence counter and the digit counter provide a versatile arrangement for controlling the logical operation of the computer. Once it is determined what sequence of sub-operations are required to carry out a desired command, the logic circuit of the central control can be readily designed using the sequence counter and the digit counter as a basis of timing the sub-operations. The logic of each command can be designed independently of any other command.

What is claimed is:

1. In a computer having a memory circuit for storing a plurality of commands, an accumulator register, an operand register, an adder circuit, and a command register including an order section and an address section, a control circuit for fetching commands from memory to the commond register and for executing the command according to the information stored in the order section using an operand in the memory circuit selected according to the information in the address section, the control circuit comprising a source of clock pulses, a first counter, a second counter, means for gating clock pulses to the first counter to step the first counter through a series of count conditions, means for gating clock pulses to the second counter to step the second counter through a series of count conditions, means responsive to the count condition of the second counter for controlling said clock pulse gating means to interrupt the stepping of the second counter when it is stepped to a predetermined count condition, means responsive to the count condition of the second counter for controlling said clock pulse gating means to interrupt the stepping of the first counter when the second counter is not at said predetermined count condition, bistable means for indicating a fetch cycle or an execute cycle, means for initially setting the bistable means to the fetch cycle indicating condition, a first gating network responsive to the count condition of the first counter, and fetch cycle condition of the bistable means for effecting transfer of a command from memory to the command register, the gating network including means for setting the second counter in response to a predetermined count condition of the first counter to delay the stepping of the first counter a selected number of clock pulse intervals to permit serial shifting of the command from memory to the command register, and means for complementing the bistable means and resetting the first counter at the completion of the fetch cycle, and a plurality of additional gating networks responsive to the execute cycle indicating condition of the bistable means, the condition established in the order section of the command register by the command information stored therein, and the count condition of the first counter, for sequentially controlling the transfer of information among the memory circuit, the adder, and the respective registers to execute the commands according to the order information.

2. In a computer having a memory circuit for storing a plurality of commands, an accumulator register, an operand register, an adder circuit, and a command register including an order section and an address section, a control circuit for fetching commands from memory to the command register and for executing the command according to the information stored in the order section using an operand in the memory circuit selected according to the information in the address section, the control circuit comprising a source of clock pulses, a first counter, a second counter, means for gating clock pulses to the first counter to step the first counter through a series of count conditions, means for gating clock pulses to the second counter to step the second counter through a series of count conditions, means responsive to the count condition of the second counter for controlling said clock pulse gating means to interrupt the stepping of the second counter when it is stepped to a predetermined count condition, means responsive to the count condition of the second counter for controlling said clock pulse gating means to interrupt the stepping of the second counter when it is stepped to a predetermined count condition, means responsive to the count condition of the second counter for controlling said clock pulse gating means to interrupt the stepping of the first counter when the second counter is not at said predetermined count condition, bistable means for indicating a fetch cycle or an execute cycle, a first gating network responsive to the count condition of the first counter, and fetch cycle condition of the bistable means for effecting transfer of a command from memory to the command register, the gating network including means for setting the second counter in response to a predetermined count condition of the first counter to delay the stepping of the first counter a selected number of clock pulse intervals to permit serial shifting of the command from memory to the command register, and a plurality of additional gating networks responsive to the execute cycle indicating condition of the bistable means, the condition established in the order section of the command register by the command information stored therein, and the count condition of the first counter, for sequentially controlling the transfer of information among the memory circuit, the adder, and the respective registers to execute the commands according to the order information.

3. In an internally programmed computer having a memory circuit for storing a plurality of commands, an accumulator register, an operand register, an adder circuit, and a command register including an order section and an address section, a control circuit for fetching commands from memory and executing the commands comprising a source of clock pulses, a sequence counter, a digit counter, means responsive to the digit counter for stepping the sequence counter by said clock pulses when the digit counter is in a predetermined count condition, whereby the sequence counter is stepped through a series of count conditions, switching means for indicating a fetch cycle or an execute cycle, a gating circuit responsive to the condition of said switching means, the information stored in the command register, the successive count conditions of the sequence counter, and the count condition of the digit counter for sequentially controlling the transfer of information among the memory, the adder, and the registers as required to fetch a command from memory and to execute the command, means for setting the digit counter by the gating circuit to any preselected count condition for each stepping condition of the sequence counter, and means for stepping the digit counter back to said predetermined count condition in response to said clock pulses, whereby the stepping of the sequence counter is interrupted by any selected number of pulse times for each condition of the sequence counter.

4. In an internally programmed computer having a memory circuit for storing a plurality of commands, an accumulator register, an operand register, an adder circuit, and a command register including an order section and an address section, a control circuit for fetching commands from memory and executing the commands comprising a source of clock pulses, a sequence counter, a digit counter, means responsive to the digit counter for stepping the sequence counter by said clock pulses when the digit counter is in a predetermined count condition, whereby the sequence counter is stepped through a series of count conditions, switching means for indicating a fetch cycle or an execute cycle, a gating circuit responsive to the condition of said switching means, the information stored in the command register, the successive count conditions of the sequence counter, and the count condition of the digit counter for sequentially controlling the transfer of information among the memory, the adder, and the registers as required to fetch a command from memory and to execute the command, means for setting the digit counter by the gating circuit to any preselected count condition, and means for stepping the digit counter back to said predetermined count condition in response to said clock pulses, whereby the stepping of the sequence counter may be interrupted by any selected number of pulse times.

5. In an internally programmed computer having a memory circuit for storing a plurality of commands, an accumulator register, an operand register, an adder circuit, and a command register including an order section and an address section, a control circuit for fetching commands from memory and executing the commands comprising a sequence counter, a digit counter, means responsive to the digit counter for stepping the sequence counter when the digit counter is in a predetermined count condition, switching means for indicating a fetch cycle or an execute cycle, a gating circuit responsive to the condition of said switching means, the information stored in the command register, the successive count conditions of the sequence counter, and the count condition of the digit counter for sequentially controlling the transfer of information among the memory, the adder, and the registers as required to fetch a command from memory and to execute the command, means for setting the digit counter by the gating circuit to any preselected count condition, and means for stepping the digit counter back to said predetermined count condition in response to said clock pulses, whereby the stepping of the sequence counter may be interrupted by any selected number of pulse times.

6. A central control circuit for a computer comprising a sequence counter, a digit counter, a clock pulse source, gating means controlled by the digit counter for diverting clock pulses to a first output when the digit counter is in a predetermined count condition and to a second output when the digit counter is not in said predetermined count condition, means for setting the digit counter to any selected count condition, means for stepping the sequence counter in response to the pulses from the first output of the gating means, means for stepping the digit counter in response to the pulses from the second output of the gating means, whereby the sequence counter is normally stepped by the clock pulses and the digit counter is stepped only when set to a different count condition from said predetermined count condition, stepping of the digit counter continuing until the digit counter is returned to said predetermined count condition, circuit means for setting the digit counter to any preselected count condition, and a gating circuit controlled by the sequence counter for cycling the computer through predetermined suboperations with each setting of the sequence counter, said gating means including means responsive to selected count conditions of the sequence counter for setting the digit counter to selected ones of its count conditions through said circuit means, the time that the sequence counter remains at a given count condition for effecting a given sub-operation being determined by the setting of the digit counter.

7. A central control for a digital computer comprising a sequence counter, a digit counter, means controlled by the digit counter for periodically stepping the sequence counter only when the digit counter is in a predetermined count condition, means for setting the digit counter to any one of a plurality of other count conditions in response to a signal on any one of a corresponding plurality of setting inputs, means controlled by the digit counter for periodically stepping the digit counter when the digit counter is set to any of said other count conditions, whereby the stepping of the sequence counter is interrupted until the digit counter is stepped back to said predetermined count condition, means controlled by the sequence counter for generating an output signal at each of successive outputs as the sequence counter is stepped, and gating means for applying the output signal from any selected output of said output signal generating means to any selected input of said digit counter setting means.

References Cited in the file of this patent

UNITED STATES PATENTS

| | | |
|---|---|---|
| 2,558,447 | MacSorley | June 26, 1951 |
| 2,815,168 | Zukin | Dec. 3, 1957 |

OTHER REFERENCES

Goldstine et al.: The Electronic Numeral Integrator and Computer (ENIAC), Mathematical Tables and Other Aids to Computation (April 1946), pp. 97 to 110, pp. 106, 107 and 110 relied on.